United States Patent
Lwin et al.

(10) Patent No.: US 12,528,407 B2
(45) Date of Patent: Jan. 20, 2026

(54) AUTOMATED HONKING SYSTEM FOR COLLISION PREVENTION

(71) Applicant: GM Cruise Holdings LLC, San Francisco, CA (US)

(72) Inventors: Jason Lwin, San Francisco, CA (US); Zehao Hu, Redwood City, CA (US); Yunjie Zhao, San Francisco, CA (US); Xiao Lin, Campbell, CA (US); Devin Wieker, Oceanside, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 76 days.

(21) Appl. No.: 18/404,491

(22) Filed: Jan. 4, 2024

(65) Prior Publication Data

US 2025/0222862 A1 Jul. 10, 2025

(51) Int. Cl.
*B60Q 5/00* (2006.01)
(52) U.S. Cl.
CPC .................................. *B60Q 5/006* (2013.01)
(58) Field of Classification Search
None
See application file for complete search history.

(56) References Cited

U.S. PATENT DOCUMENTS

| | | | | |
|---|---|---|---|---|
| 11,427,195 B1* | 8/2022 | Pertsel | ................ | B60W 30/09 |
| 11,648,939 B2* | 5/2023 | Crego | ............ | B60W 60/00272 |
| | | | | 701/301 |
| 11,840,221 B2* | 12/2023 | Ha | ........................ | G08G 1/166 |
| 11,872,976 B2* | 1/2024 | Toth | .................... | B60W 60/001 |
| 12,087,102 B1* | 9/2024 | Bates | .................. | B60W 60/007 |
| 2017/0120804 A1* | 5/2017 | Kentley | .................. | B60R 21/01 |
| 2017/0297569 A1* | 10/2017 | Nilsson | .................. | B60K 28/10 |
| 2018/0074490 A1* | 3/2018 | Park | ....................... | G05D 1/0027 |
| 2022/0227372 A1* | 7/2022 | Nilsson | .................. | G08G 1/167 |
| 2023/0182775 A1* | 6/2023 | Beaurepaire | .......... | B60W 50/14 |
| | | | | 701/26 |
| 2024/0083460 A1* | 3/2024 | Yeom | .............. | B60W 30/18163 |
| 2024/0416898 A1* | 12/2024 | Perez Barrera | ... | B60W 60/0015 |
| 2024/0416949 A1* | 12/2024 | Barrera | ................. | B60W 30/16 |

* cited by examiner

*Primary Examiner* — Muhammad Adnan
(74) *Attorney, Agent, or Firm* — Honigman LLP; Matthew H. Szalach; Jonathan P. O'Brien

(57) ABSTRACT

Systems and methods for identifying potential collisions in which another vehicle may collide with the AV. The AV detects the other vehicle and determines the other vehicle speed, acceleration, and trajectory. The AV determines that there is a risk of collision if the other vehicle continues on its current trajectory at its current speed and its current acceleration. When an AV determines there is an imminent risk that another vehicle may collide with the AV, the AV can initiate a honk to alert the other vehicle of the potential collision. In some examples, the AV can identify a potential rear end collision, and the AV can honk at the vehicle approaching it from behind. In other examples, the approaching vehicle can come from any direction. Honking is designed to be limited so that an AV does not initiate too many honks.

20 Claims, 8 Drawing Sheets

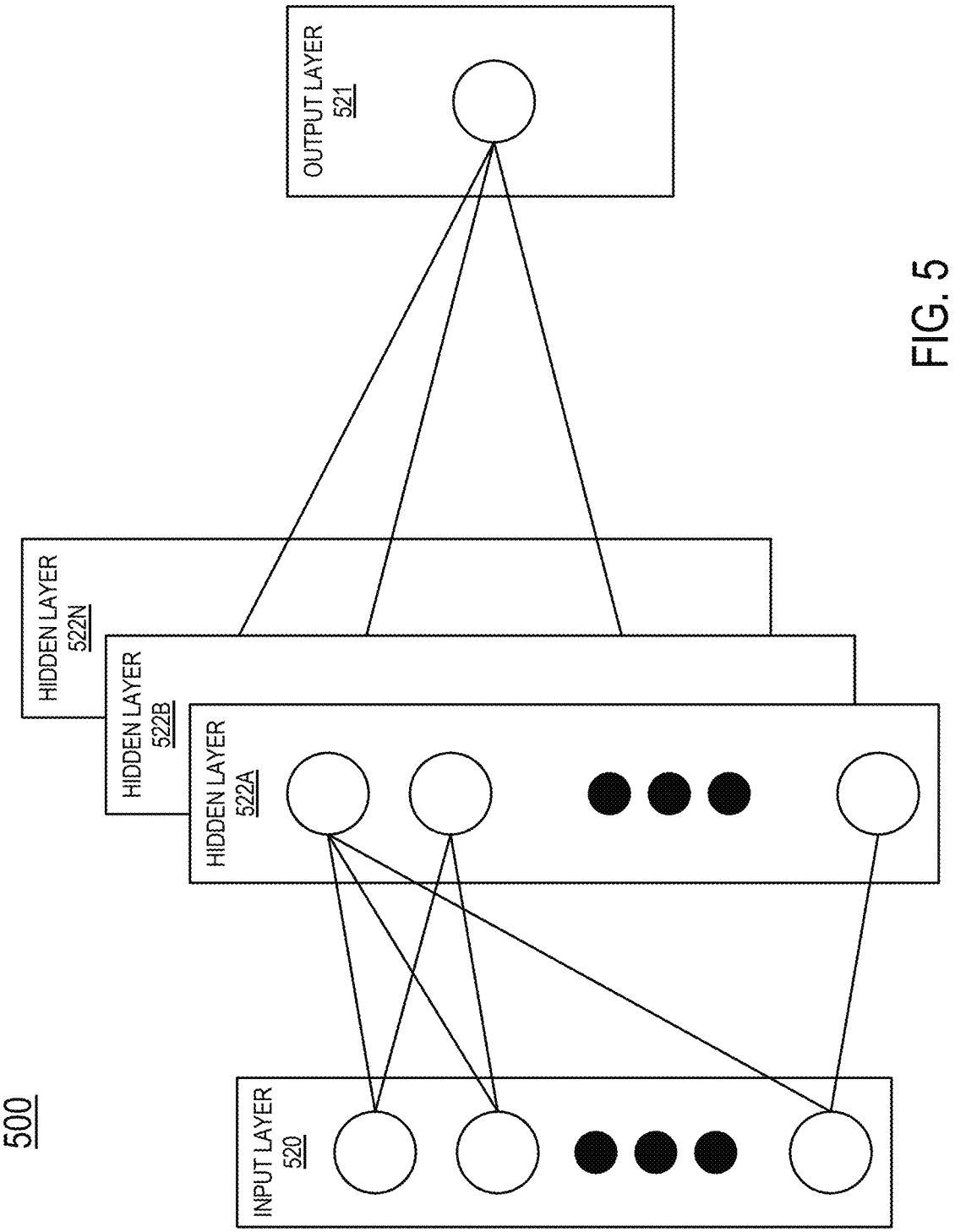

AUTOMATED HONKING SYSTEM FOR COLLISION PREVENTION

BACKGROUND

1. Technical Field

The present disclosure generally relates to vehicle honking, and, more specifically, to automated vehicle honking for collision prevention.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5 illustrates an example of a deep learning neural network that can be used to implement a perception module and/or one or more validation modules, according to some aspects of the disclosed technology;

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Autonomous vehicles ("AVs") provide driverless ride services, allowing a user to request a ride from a pick-up location to a destination location. AVs include many sensors that monitor the vehicle surroundings to enable autonomous driving functionality. An AV detects objects in its surroundings, including, for example, other vehicles in proximity to the AV. The AV detects the other vehicles and also monitors the movement of other vehicles and the predicted paths of other vehicles. Because an AV is monitoring the movement of nearby vehicles, the AV can detect when a vehicle is approaching the AV, the AV can determine the speed of the approaching vehicle, and the AV can determine the acceleration (or deceleration) of the approaching vehicle.

In various scenarios, other vehicles can collide with AVs, for example if a driver is not paying attention or if the driver does not see the AV. A vehicle honk can be used in these scenarios to alert the other vehicle and/or the driver of the vehicle of the presence of the AV.

Systems and methods are provided herein to identify potential collisions in which another vehicle may collide with the AV if the other vehicle continues on its current trajectory at its current speed and its current acceleration. When an AV determines there is an imminent risk that another vehicle may collide with the AV, the AV can initiate a honk to alert the other vehicle of the potential collision. In some examples, the AV can identify a potential rear end collision, that is an approaching vehicle from behind the AV, and the AV can honk at the vehicle approaching it from behind. In some examples, the approaching vehicle is driving in reverse, (i.e., reversing). In other examples, the approaching vehicle can come from any direction. As described herein, honking is designed to be limited so that an AV does not initiate too many honks.

Example AV System for Automated Honking for Collision Prevention

Figure 1:
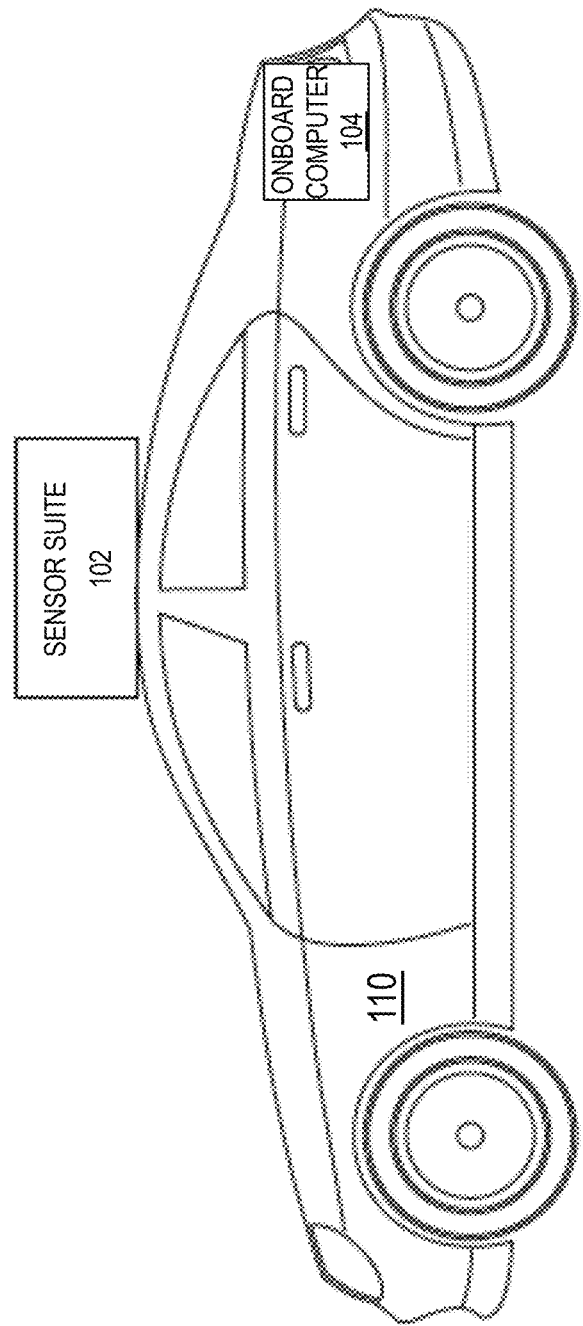
FIG. 1 illustrates an autonomous vehicle including a system for automated honking to prevent collisions according to some examples of the present disclosure.

FIG. 1 illustrates an autonomous vehicle 110 including a system for automated honking to prevent collisions, according to some examples of the present disclosure. The autonomous vehicle 110 includes a sensor suite 102 and an onboard computer 104. The sensor suite 102 can include multiple cameras, and the onboard computer 104 can include a potential collision identification module and an automated honking system as described herein. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. The sensor suite 102 can be used to detect other vehicles in proximity to the autonomous vehicle. In some examples, data from the sensor suite 102 can be used to identify other vehicles that have a speed, acceleration, and trajectory that could lead to a potential collision with the autonomous vehicle. Additionally, sensor suite 102 data can provide localized traffic information, ongoing road work information, and current road condition information.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with a dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine the state of the autonomous vehicle 110. In some examples, the onboard computer 104 checks for vehicle updates from a central computer or other secure access points. In some examples, the onboard computer 104 performs real time diagnostics of circuit boards in the vehicle. In some examples, the onboard computer 104 performs real time diagnostics of signal transmissions in the vehicle. In some examples, a vehicle sensor log receives and stores processed sensed sensor suite 102 data from the onboard computer 104. In some examples, a vehicle sensor log receives sensor suite 102 data from the sensor suite 102.

In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle.

In various implementations, the onboard computer 104 processes sensor suite 102 data and identifies potential collision scenarios. In particular, the onboard computer 104 detects other vehicles in proximity to the autonomous vehicle 110, determines the trajectory, speed, and acceleration of the other vehicles, determines the future path of the other vehicles, and determines a likelihood of each of the other vehicles colliding with the autonomous vehicle. In some examples, when the onboard computer 104 and/or a collision probability platform identifies a likely collision, the onboard computer 104 can initiate a vehicle honk. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine the states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles. In some examples, the onboard computer 104 is coupled to the imaging backbones described herein. In some examples, the imaging backbones are components of the onboard computer 104.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle. In general. Various embodiments herein and their advantages may apply to a wide range of vehicles (e.g., semi-autonomous vehicles, vehicles with driver-assist functionalities, etc.), and not just AVs.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Collision Probability Determination and Automated Honking

Figure 2:
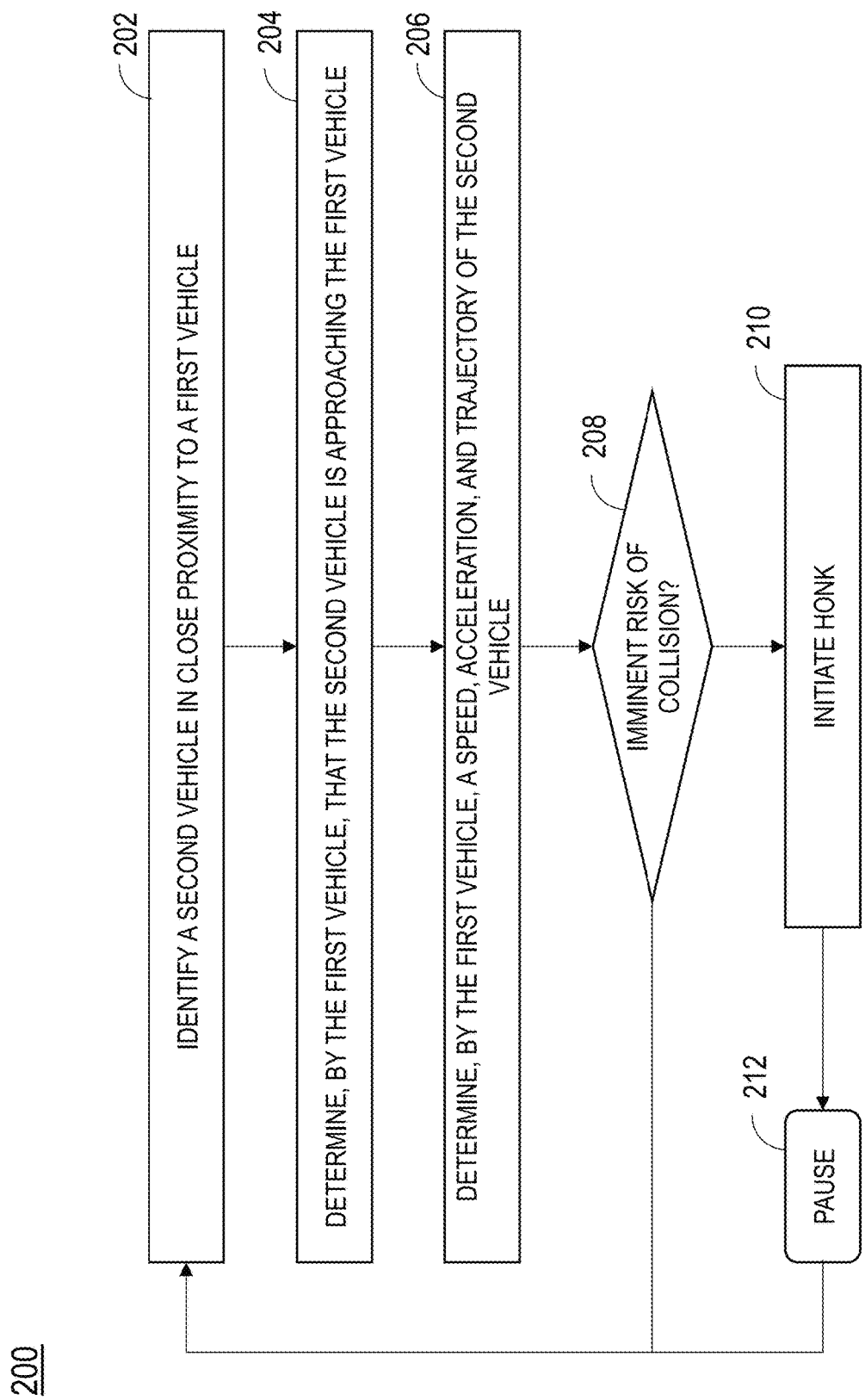
FIG. 2 is a flow chart illustrating an exemplary method for automated honking for collision prevention, according to some examples of the present disclosure.

FIG. 2 is a flow chart illustrating an exemplary method 200 for automated honking for collision prevention, according to some examples of the disclosure. At step 202, a first AV identifies another vehicle in close proximity to the first autonomous vehicle. The first AV includes multiple sensors as discussed above, and using sensor data, the first AV detects other vehicles and objects in its vicinity. The first AV can categorize detected objects and identify other vehicles including a second vehicle. The first AV includes a collision probability platform as described below with respect to FIG. 3.

At 204, the collision probability platform determines that the second vehicle is approaching the AV. In particular, the first AV determines that the distance between AV and the second vehicle is decreasing. At step 206, the first AV determines the speed, acceleration, and trajectory of the second vehicle. The acceleration can include a deceleration. The trajectory can include the current direction of travel of the second vehicle as well as predicted future positions of the second vehicle. The collision probability platform of the first AV receives the speed, acceleration, and trajectory information about the second vehicle.

At step 208, the collision probability platform determines whether there is an imminent risk that the second vehicle will collide with the first AV. In particular, the first AV collision probability platform can include a collision probability determination module as described below with respect to FIG. 3, and the collision probability determination module can use information about the current position of the second vehicle, the current speed of the second vehicle, the current acceleration of the second vehicle, and the predicted trajectory of the second vehicle to determine the likelihood of a collision. For instance, the collision probability determination module may determine, based on the current speed, acceleration, trajectory, and position of the second vehicle, that without any changes in the measurements, the second vehicle will collide with the first AV. In some examples, an imminent risk includes a risk that a collision will occur within three seconds, that is, in three seconds or in less than three seconds from the current time. In some examples, an imminent risk includes a risk that a collision will occur in two seconds or in less than two seconds from the current time. In some examples, the imminent risk includes a risk that a collision will occur within a selected time period, and the selected time period is longer than an estimated time for the second vehicle to brake and prevent the collision. In some examples, the second vehicle is within a selected distance of the AV before a risk is considered imminent. For example, a second vehicle may have to be within ten meters of the AV. In some examples, the distance depends on the speed and acceleration of the second vehicle and the speed and acceleration of the AV.

In some examples, the collision probability determination module can determine a probability that the second vehicle will collide with the first AV based on first vehicle sensor data. In some examples, the collision probability determination module also incorporates data regarding the first AV and movements of the first AV, such as the speed of the first AV, the acceleration of the first AV, the trajectory of the first AV, and the planned path of the first AV. Thus, the collision probability determination module can determine a probability that the second vehicle will collide with the first AV if both vehicles continue on their current courses. Additionally, the first AV can alter its path and/or its planned path based on data from the second vehicle, and the collision probability determination module can determine a probability that the second vehicle will collide with the first AV based on the first AV's current (updated) path and/or planned path.

In some examples, the collision probability determination module double-checks the collision probability determination by re-determining the collision probability more than one time before initiating a honk. For instance, when the collision probability determination module determines a high likelihood of collision, the collision probability determination module can use a next set of data to determine an updated collision probability and confirm the likelihood of collision is still high, before initiating a honk. In some examples, the re-check occurs between 10-100 ms after the first positive collision probability determination.

At step 208, if the collision probability platform on the first AV determines there is an imminent risk that the second vehicle will collide with the first AV, the first AV initiates a honk to alert that second vehicle of the risk of collision. In some examples, a honk is a double honk (e.g., "beep beep"), with each sound emission (each "beep" of the double honk) lasting less than two seconds. In some examples, the AV can honk for a selected period of time, such as three seconds or less than three seconds. The first AV may have to travel a selected distance before it can initiate another honk. In some examples, the AV can honk until the second vehicle changes its speed, acceleration, and/or trajectory. In some examples, the AV stops honking at the time of the predicted collision. In some examples, the AV stops honking when a collision occurs. After the first AV initiates a honk at step 210, the method pauses for a selected period of time at step 212 before returning to step 202. In some examples, the pause is for a selected distance, for example, after the AV has traveled 10 meters from its previous honk location. In some examples, the pause can be a five second pause, a ten second pause, or a twenty second pause. In some examples, an AV can honk at another road user only one time. In general, the method 200 pauses after a honk to prevent the first AV from repeatedly honking after already alerting the second vehicle of the collision risk. Repeated honking or over-honking is avoided because it can annoy other road users.

If, at step 208, the collision probability determination module determines there is no imminent risk that the second vehicle will collide with the first AV, the method 200 returns to step 202. In some examples, the collision probability determination module continues to monitor the second vehicle, repeating steps 204, 206, and 208 until the risk of collision dissipates.

In various examples, the method 200 is directed to detecting collisions from behind or beside the first AV. For example, at step 202, the collision probability platform can focus on vehicles approaching the first AV from the rear or sides. A second vehicle approaching the first AV from the rear is at risk of rear-ending the first AV. Similarly, a second vehicle pulling out from a parking space towards a side of the AV is at risk of colliding with a side of the first AV. In some examples, the method 200 is directed to detecting other vehicles that are reversing towards the first AV. For instance, a second vehicle reversing out of a parking space may be less likely to detect traffic behind the second vehicle. Thus, in some examples, a collision probability determination module may increase the probability of collision when the approaching vehicle is reversing towards the first AV.

In some examples, the first AV can acoustically direct the honk towards the second vehicle. For instance, if the second vehicle is approaching from the rear of the first AV, and the collision probability determination module determines there is an imminent risk of collision at step 208, the first AV can initiate a honk from speakers projecting outward from the rear of the first AV. Similarly, if the second vehicle is approaching from the right of the first AV, and the collision probability platform determines there is an imminent risk of collision at step 208, the first AV can initiate a honk from speakers projecting outward from the right side of the first AV. Similarly, if the second vehicle is approaching from the left of the first AV, and the collision probability platform determines there is an imminent risk of collision at step 208, the first AV can initiate a honk from speakers projecting outward from the left side of the first AV.

Example Diagram of a Collision Probability Platform

Figure 3:
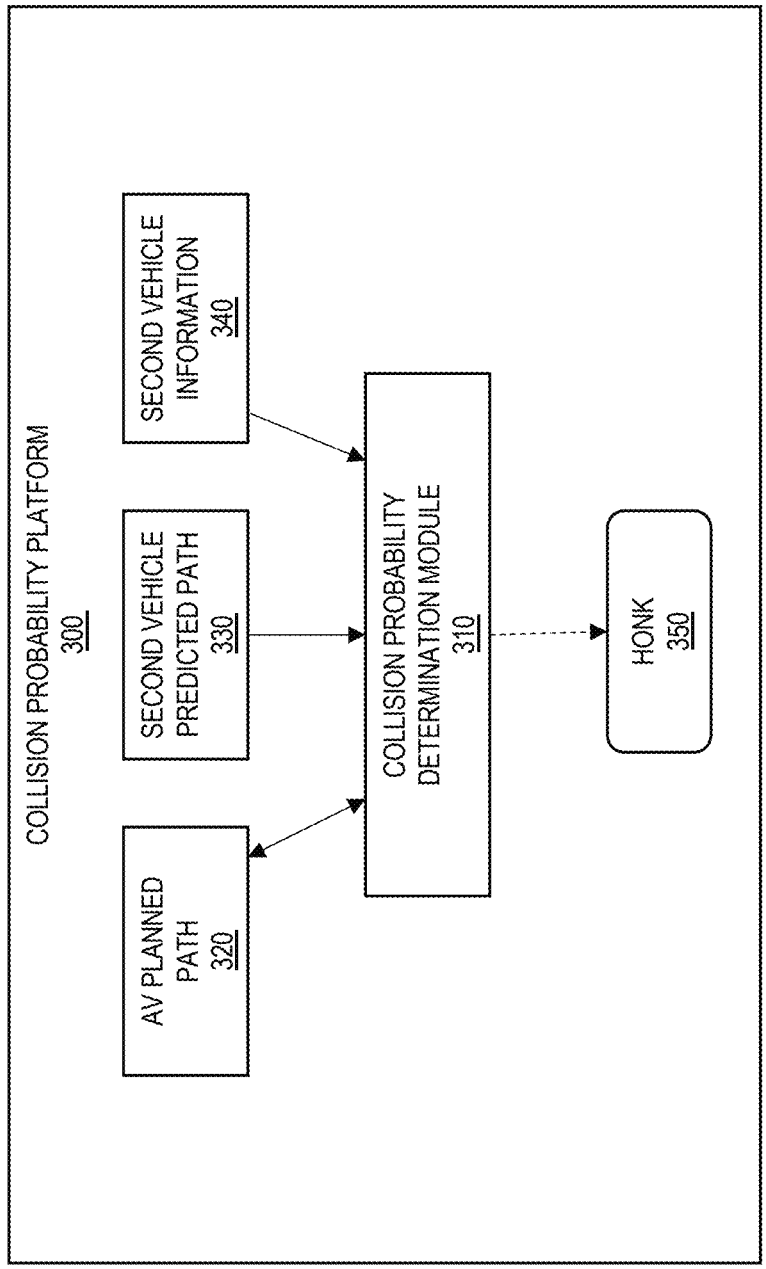
FIG. 3 is block diagram illustrating an example of a platform for determining collision probability, according to various examples of the present disclosure.

FIG. 3 is a block diagram illustrating an example of a platform 300 for determining collision probability, according to various examples of the present disclosure. In particular, a collision probability platform 300 includes a collision probability module 310 that receives data regarding the AV's planned path 320, a second vehicle's predicted path 330, and information about the second vehicle 340. The AV's planned path 320 includes current information on the AV's path from the onboard computer and the AV's planning stack, as described below with respect to FIG. 6. In some examples, for every planned path for the AV, a collision probability estimate is generated. The second vehicle's predicted path 330 is determined by the collision probability platform 300 based on the AV's sensor data, including the second vehicle's speed, the second vehicle's acceleration, and the second vehicle's current direction of movement. The second vehicle's predicted path 330 can include estimated times that the second vehicle will be at each predicted location between the AV and the current position of the second vehicle. In some examples, the AV performs kinematic tracking of the second vehicle. The information about the second vehicle 340 can include whether the second vehicle is driving forward or reversing, the size of the second vehicle, and whether the second vehicle has a driver or is an autonomous vehicle.

According to various implementations, the collision probability module 310 determines a likelihood of collision within a selected period of time. In particular, the collision probability module 310 determines the likelihood that the second vehicle will collide with the AV within a selected period of time. The selected period of time can be two or three seconds. In some examples, the likelihood can depend on a combination of the data input regarding the AV's planned path 320, a second vehicle's predicted path 330, and information about the second vehicle 340. In some examples, if the information about the second vehicle 340 includes that the second vehicle is reversing towards the AV, the probability can be increased by a selected amount based on an increased likelihood that the second vehicle is unaware of the imminent risk of collision. In various examples, a neural network can be trained to determine the likelihood of collision based on simulation data simulating previous collisions with AVs and previous near-collisions with AVs. In some examples, the neural network can determine, based on training data, how much to increase the probability of collision based on various factors in the input data and second vehicle information.

The collision probability module 310 can compare the likelihood of collision with a selected threshold to determine whether to initiate an AV honk 350. In various examples, if the likelihood of a collision within the selected time period is above the threshold, the collision probability module 310 initiates a honk 350 to alert the second vehicle of the risk of collision. In some examples, the duration of the honk 350 can be the duration of time before the possible imminent collision. In some examples, the duration of the honk 350 can be less than the duration of time before the possible imminent collision. Once the AV has initiated a honk 350, the AV can be prevented from initiating a second honk for a selected period of time, in order to prevent repeated AV honking.

In some examples, the collision probability module 310 can also transmit likelihood of collision data back to the AV planned path module 320, and the AV onboard computer can determine whether the AV can perform any mitigation measures to attempt to avoid the collision. For example, if the second vehicle is approaching the AV from behind the AV, the AV may be able to drive forward a short distance (e.g., one or two feet) to attempt to avoid the second vehicle rear-ending the AV. In another example, if the second vehicle is driving out toward a side of the AV path and/or toward a side of the AV, the AV can swerve around the predicted second vehicle path and/or brake to attempt to avoid the collision.

Example Diagrams Showing Potential Imminent Collisions

Figure 4A:
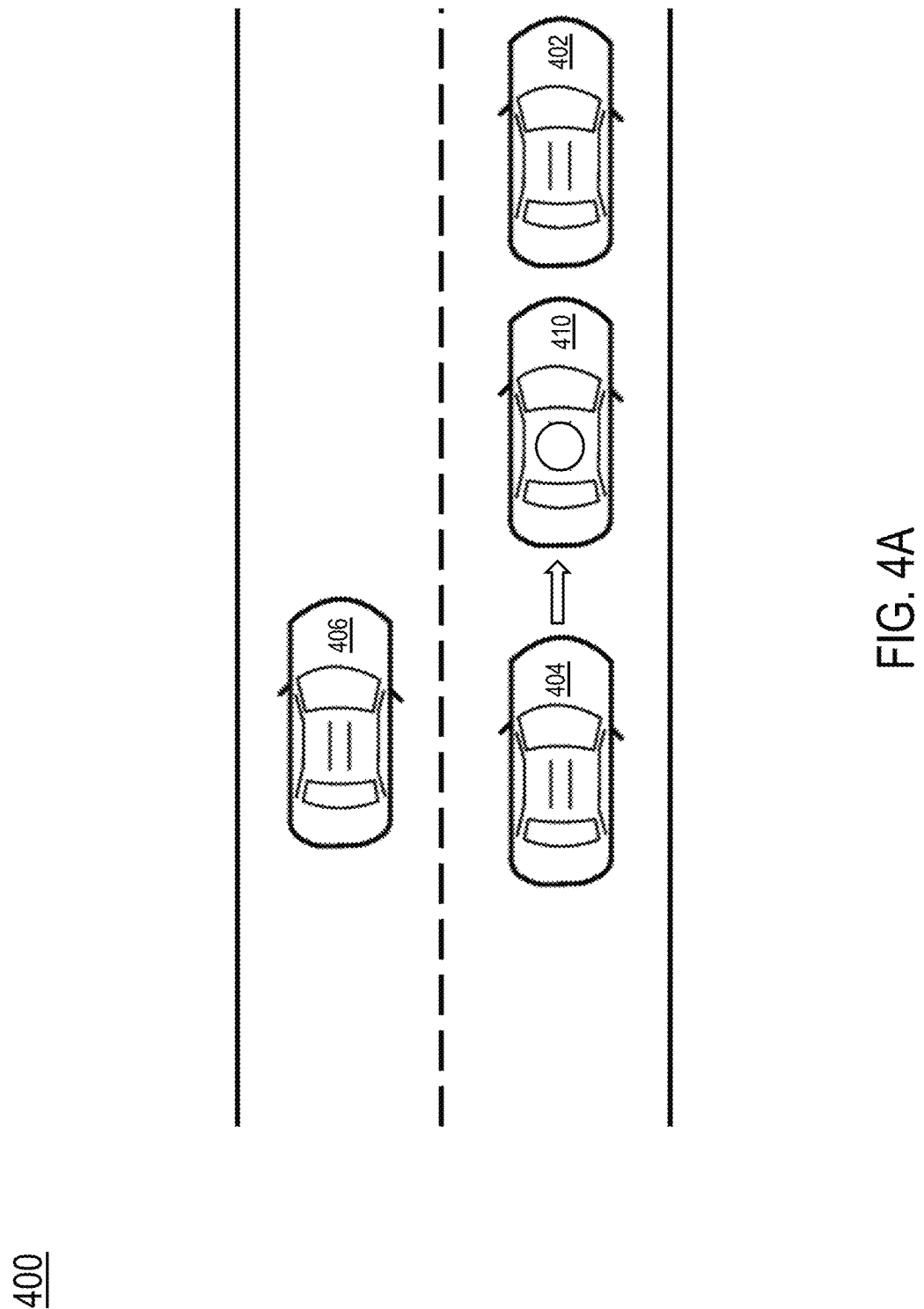
FIGS. 4A-4B show examples of a map diagrams showing an AV and a second vehicle moving toward the AV or toward the AV's planned path, according to various examples of the present disclosure.
Figure 4B:
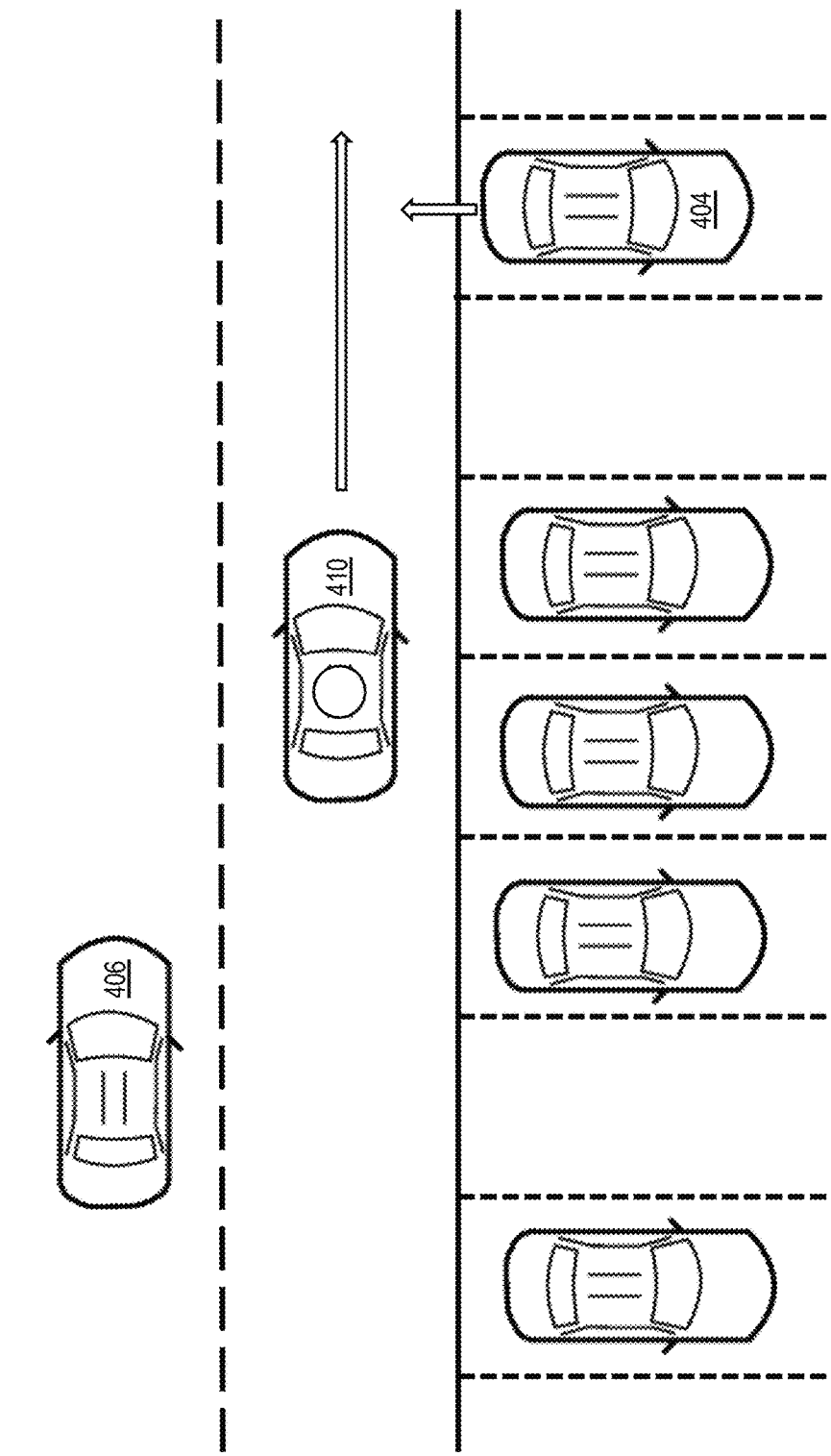

FIGS. 4A-4B show examples of a map diagram 400, 450 showing an AV and a second vehicle moving toward the AV or toward the AV's planned path, according to various examples of the present disclosure. FIG. 4A illustrates an example in which the AV 410 is stopped behind a first vehicle 402. In some examples, the first vehicle 402 can be stopped at a stop sign, stopped at a stop light, stopped to wait for an opportunity for a right turn, stopped to allow another vehicle to park, etc. There are many reasons the first vehicle 402 may be stopped.

While the AV 410 is stopped behind the first vehicle 402, AV sensors detect other road users, including a second vehicle 404 and a third vehicle 406. In various examples, a collision probability platform on the AV 410 can receive data about the second vehicle 404, including second vehicle 404 position, speed, acceleration, and trajectory. The collision probability platform also receives data about the AV 410, including its speed, acceleration, and planned path. Given that the AV 410 is stopped in the example in FIG. 4A, the data about the AV 410 can include that the AV 410 is currently stopped, as well as a distance between the AV 410 and the first vehicle 402. The collision probability platform on the AV 410 can also receive data about the third vehicle 406. In some examples, the collision probability platform can determine that there is a low likelihood of the third vehicle 406 colliding with the AV 410.

In some examples, the collision probability platform on the AV 410 can determine that there is a risk that the second vehicle 404 will collide with the AV 410. In particular, a collision probability determination module can determine that there is a selected probability that the second vehicle 404 will rear-end the AV 410 within a selected period of time given current AV data about the second vehicle 404. Once the collision probability determination module determines that there is an imminent risk of collision, the collision probability platform can initiate an AV honk. In some examples, the AV honk can be directed behind the AV 410 toward the second vehicle 404. In some examples, the AV 410 can also move forward into the space between the AV 410 and the first vehicle 402. In various examples, the AV honk is intended to alert the driver of the second vehicle 404 of the potential collision in time for the second vehicle 404 to stop before it collides with the AV 410. For instance, if the driver of the second vehicle 404 applies the brakes upon hearing the horn from the AV 410, the second vehicle 404 will stop before rear-ending the AV 410.

FIG. 4B illustrates an example in which the AV 410 is driving along a road with cars parked along the right hand side of the road. In the example of FIG. 4B, the cars are parked perpendicular to the road, but in other examples, the cars can be parked in any selected orientation. The second vehicle 404 is reversing out of a parking spot, and, according to various examples, the trajectory of the second vehicle 404 will cause the second vehicle 404 to collide with the AV 410 if neither vehicle changes course.

In various examples, a collision probability platform on the AV 410 can receive data about the second vehicle 404, including second vehicle 404 position, speed, acceleration, and trajectory, as well as the fact that the second vehicle 404 is driving in reverse. The collision probability platform also receives data about the AV 410, including its speed, acceleration, and planned path. The collision probability platform on the AV 410 can also receive data about the third vehicle 406, which is passing on its left. In some examples, the collision probability platform can determine that there is a low likelihood of the third vehicle 406 colliding with the AV 410.

In some examples, the collision probability platform on the AV 410 can determine that there is a risk that the second vehicle 404 will collide with the AV 410. In particular, a collision probability determination module can determine that there is a selected probability that the second vehicle 404 will back into the side of the AV 410 as the AV 410 passes the second vehicle 404, and that the collision will occur within a selected period of time given current AV data about the second vehicle 404. Once the collision probability determination module determines that there is an imminent risk of collision, the collision probability platform can initiate an AV honk. In some examples, the AV honk can be directed toward the second vehicle 404. In various examples, the AV honk is intended to alert the driver of the second vehicle 404 of the potential collision in time for the second vehicle 404 to stop before it collides with the AV 410. For instance, if the driver of the second vehicle 404 applies the brakes upon hearing the horn from the AV, the second vehicle 404 will stop before colliding with the AV 410. In some examples, the AV 410 can also swerve slightly to the left, while considering other traffic, including the third vehicle 406. In some examples, the AV 410 can apply its brakes to attempt to avoid a collision with the second vehicle 404.

Example Neural Network

In FIG. 5, the disclosure now turns to a further discussion of models that can be used through the environments and techniques described herein. Specifically, FIG. 5 is an illustrative example of a deep learning neural network 500 that can be used to implement all or a portion of a collision probability platform and/or a collision probability determination module as discussed above. Additionally, the deep learning neural network 500 can be used to implement one or more of the perception stack 612, the localization stack 614, the planning stack 616, and the control stack 618, described below. An input layer 520 can be configured to receive sensor data and/or data relating to an environment surrounding an autonomous vehicle, as well as data on a next planned AV maneuver. The sensor data can include imaging data from various AV cameras. The neural network 500 includes multiple hidden layers 522a, 522b, through 522n. The hidden layers 522a, 522b, through 522n include the "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522a, 522b, through 522n. In one illustrative example, for a collision probability platform, the output layer 521 can determine whether an AV honk is initiated.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Autonomous Vehicle (AV) Management System

Figure 6:
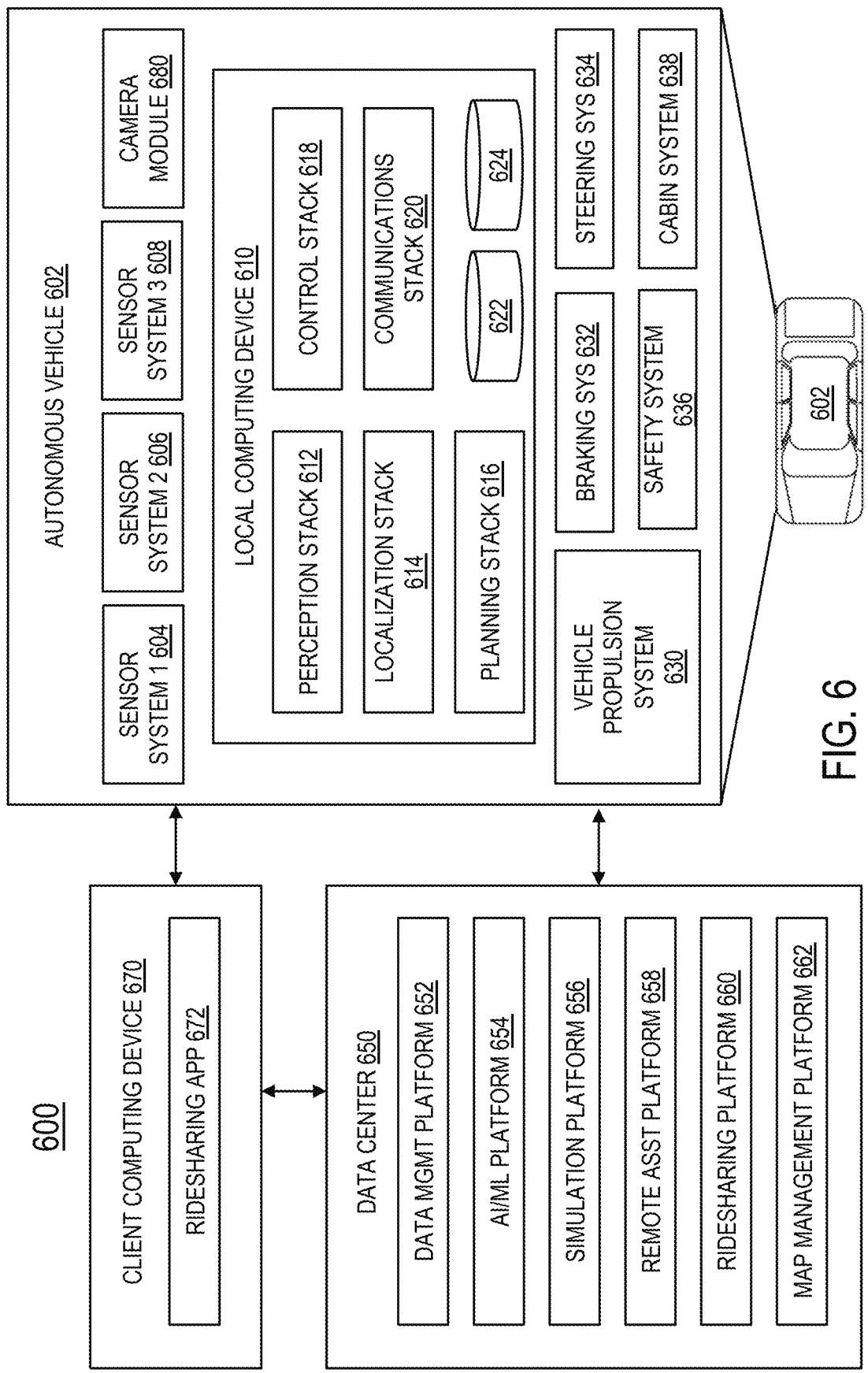
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors. Additionally, in various implementations, as discussed herein, collision probability platform 680 can be used for detecting imminent collisions and initiating an AV honk. The collision probability platform 680 can include a collision probability determination module as described herein, which can determine the likelihood of another vehicle colliding with the AV.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processing System

Figure 7:
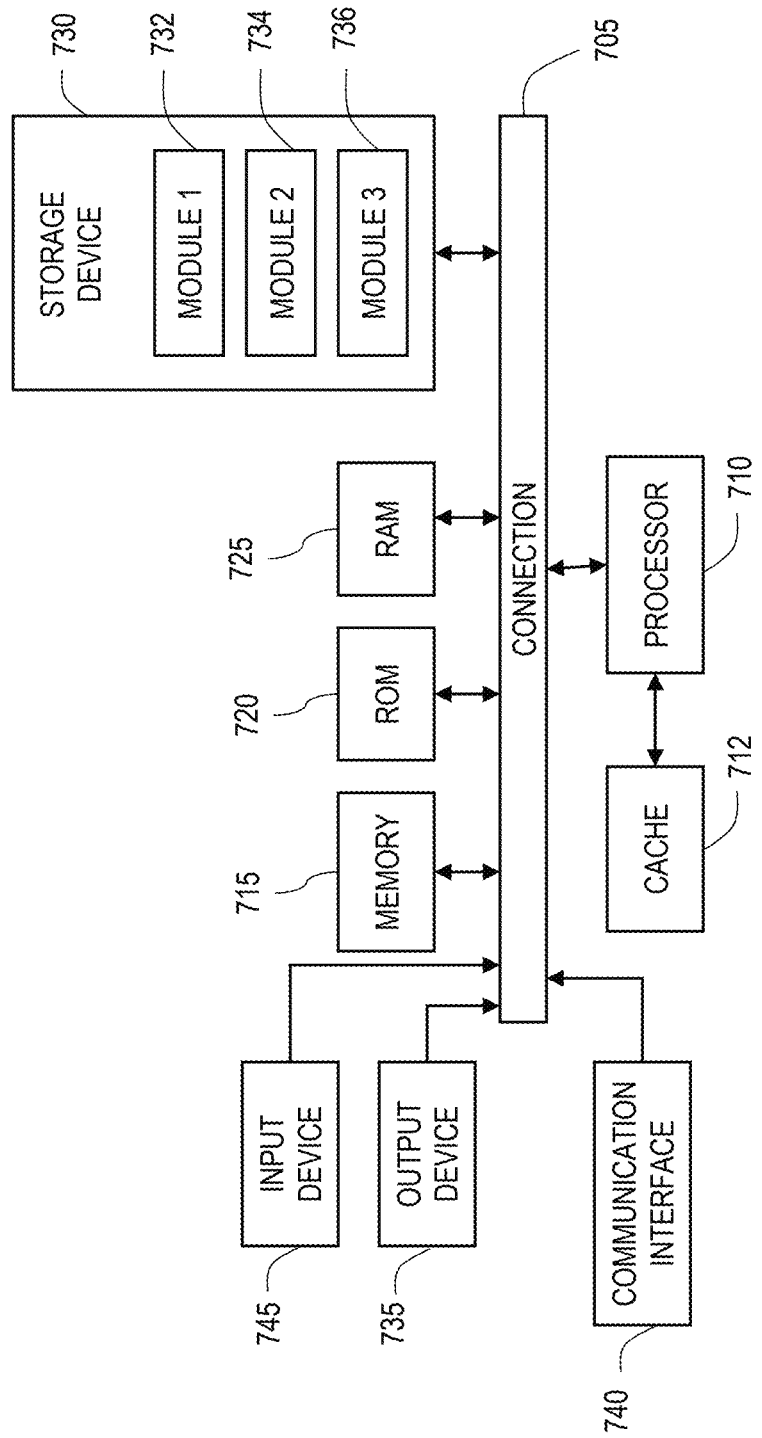
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection. In various examples, an active tunable filter as discussed herein can be added to any of the components to filter harmonics and/or noise from transmitted signals.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides an autonomous vehicle for emitting honks to prevent vehicle collisions, comprising: a sensor suite including a plurality of external sensors to generate sensor data; an onboard computer configured to: receive the sensor data; detect other road users including a second vehicle, based on the sensor data; determine second vehicle data for the second vehicle, including second vehicle speed, second vehicle acceleration, and second vehicle trajectory; determine second vehicle predicted path for the second vehicle; and determine a planned path for the autonomous vehicle; and a collision probability platform including: a collision probability determination module configured to: determine that the second vehicle is in close proximity to the autonomous vehicle, receive the second vehicle data and the second vehicle predicted path from the onboard computer, identify an imminent risk of the second vehicle colliding with the autonomous vehicle, and transmit an autonomous vehicle honk instruction, and a honk module configured to receive the autonomous vehicle honk instruction and emit an autonomous vehicle honk in response to the instruction.

Example 2 provides a method, system, and/or vehicle according to one or more of the preceding and/or following examples, wherein the collision probability determination module is further configured to identify the imminent risk by determining a time to the second vehicle colliding and determining the time is below a selected threshold time.

Example 3 provides a method, system, and/or vehicle according to one or more of the preceding and/or following examples, wherein the collision probability determination module is further configured to identify the imminent risk by determining a probability of the second vehicle colliding with the autonomous vehicle and determining the probability is above a selected threshold probability.

Example 4 provides a method, system, and/or autonomous vehicle of example 1, where the second vehicle data includes second vehicle driving direction and where second vehicle driving direction includes one of driving forward and reversing.

Example 5 provides a method, system, and/or autonomous vehicle of example 4, where the collision probability determination module is further configured to: determine that the second vehicle is reversing based on the second vehicle data, and increase a probability of the second vehicle colliding with the autonomous vehicle.

Example 6 provides a method, system, and/or the autonomous vehicle of example 4, where the collision probability determination module is further configured to determine that the second vehicle is behind the autonomous vehicle, and identify the imminent risk by determining a probability the second vehicle will rear-end the autonomous vehicle.

Example 7 provides a method, system, and/or autonomous vehicle of example 6, where the honk module is further configured to emit a honk from speakers facing outward from a rear of the autonomous vehicle toward the second vehicle.

Example 8 provides a method for emitting honks to prevent vehicle collisions, including receiving sensor data from a plurality of vehicle sensors; detecting other road users including a second vehicle, based on the sensor data; determining second vehicle data for the second vehicle, including second vehicle speed, second vehicle acceleration, and second vehicle trajectory; determining second vehicle predicted path for the second vehicle; determining a planned path for the autonomous vehicle; determining that the second vehicle is in close proximity to the autonomous vehicle, receiving the second vehicle data and the second vehicle predicted path from the onboard computer, identifying an imminent risk of the second vehicle colliding with the autonomous vehicle, and emitting an autonomous vehicle honk in response to the instruction.

Example 9 provides the method, system, and/or autonomous vehicle of example 8, further including identifying the imminent risk by determining a time to the second vehicle colliding and determining the time is below a selected threshold time.

Example 10 provides the method, system, and/or autonomous vehicle of example 8, further including identifying the imminent risk by determining a probability of the second vehicle colliding with the autonomous vehicle and determining the probability is above a selected threshold probability.

Example 11 provides the method, system, and/or autonomous vehicle of example 8, where the second vehicle data includes second vehicle driving direction and where second vehicle driving direction includes one of driving forward and reversing.

Example 12 provides the method, system, and/or autonomous vehicle of example 11, further including determining that the second vehicle is reversing based on the second vehicle data, and increasing a probability of the second vehicle colliding with the autonomous vehicle.

Example 13 provides the method, system, and/or autonomous vehicle of example 11, further including determining that the second vehicle is behind the autonomous vehicle, and identifying the imminent risk by determining a probability the second vehicle will rear-end the autonomous vehicle.

Example 14 provides the method, system, and/or autonomous vehicle of example 13, where emitting the autonomous vehicle honk includes emitting the autonomous vehicle honk from speakers facing outward from a rear of the autonomous vehicle toward the second vehicle.

Example 15 provides one or more non-transitory computer-readable media storing instructions executable to perform operations, the operations including receiving sensor data from a plurality of vehicle sensors; detecting other road users including a second vehicle, based on the sensor data; determining second vehicle data for the second vehicle, including second vehicle speed, second vehicle acceleration, and second vehicle trajectory; determining second vehicle predicted path for the second vehicle; determining a planned path for the autonomous vehicle; determining that the second vehicle is in close proximity to the autonomous vehicle, receiving the second vehicle data and the second vehicle predicted path from the onboard computer, identifying an imminent risk of the second vehicle colliding with the autonomous vehicle, and emitting an autonomous vehicle honk in response to the instruction.

Example 16 provides the one or more non-transitory computer-readable media of example 15, the operations further including identifying the imminent risk by determining a time to the second vehicle colliding and determining the time is below a selected threshold time.

Example 17 provides the one or more non-transitory computer-readable media of example 15, the operations further including identifying the imminent risk by determining a probability of the second vehicle colliding with the autonomous vehicle and determining the probability is above a selected threshold probability.

Example 18 provides the one or more non-transitory computer-readable media of example 15, where the second vehicle data includes second vehicle driving direction and where second vehicle driving direction includes one of driving forward and reversing.

Example 19 provides the one or more non-transitory computer-readable media of example 18, the operations further including determining that the second vehicle is reversing based on the second vehicle data, and increasing a probability of the second vehicle colliding with the autonomous vehicle.

Example 20 provides the one or more non-transitory computer-readable media of example 18, the operations further including determining that the second vehicle is behind the autonomous vehicle, and identifying the imminent risk by determining a probability the second vehicle will rear-end the autonomous vehicle.

Example 21 includes an apparatus comprising means for performing the method of any of the examples 1-20.

Example 22 provides a method, system, and/or vehicle according to one or more of the preceding and/or following examples, wherein a duration of the honk is based on a risk of a collision.

Example 23 provides a method, system, and/or vehicle according to one or more of the preceding and/or following examples, wherein a duration of the honk is based on a probability of a collision.

Example 24 provides a method, system, and/or vehicle according to one or more of the preceding and/or following examples, wherein a volume of the honk is based on a risk of a collision.

Example 25 provides a method, system, and/or vehicle according to one or more of the preceding and/or following examples, wherein a volume of the honk is based on a probability of a collision.

Example 26 provides a method, system, and/or vehicle according to one or more of the preceding and/or following examples, wherein the honk includes a plurality of honks and wherein a number of honks included in the plurality of honks is based on a risk of a collision.

Example 25 provides a method, system, and/or vehicle according to one or more of the preceding and/or following examples, wherein the honk includes a plurality of honks and wherein a number of honks included in the plurality of honks is based on a probability of a collision.

Example 26 provides a method, system, and/or vehicle according to one or more of the preceding and/or following examples, wherein the honk includes a plurality of honks and wherein a pattern of honks included in the plurality of honks is based on a risk of a collision.

Example 27 provides a method, system, and/or vehicle according to one or more of the preceding and/or following examples, wherein the honk includes a plurality of honks and wherein a pattern of honks included in the plurality of honks is based on a probability of a collision.

Example 28 provides a first vehicle for emitting honks to prevent vehicle collisions, comprising: a sensor suite including a plurality of external sensors to generate sensor data; an onboard computer configured to: receive the sensor data; detect other road users including a second vehicle, based on the sensor data; determine second vehicle data for the second vehicle, including second vehicle speed, second vehicle acceleration, and second vehicle trajectory; determine second vehicle predicted path for the second vehicle; and determine a planned path for the first vehicle; and a collision probability platform including: a collision probability determination module configured to: determine that the second vehicle is in within a threshold distance of the first vehicle, receive the second vehicle data and the second vehicle predicted path from the onboard computer, identify an imminent risk of the second vehicle colliding with the first vehicle, and transmit a first vehicle honk instruction, and a honk module configured to receive the first vehicle honk instruction and emit a vehicle honk in response to the instruction.

Example 29 provides a method, system, and/or vehicle according to one or more of the preceding and/or following examples, wherein the threshold distance is equal to and/or less than a distance at which a probability of collision increases above a threshold probability.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An autonomous vehicle for emitting honks to prevent vehicle collision, comprising:
a sensor suite including a plurality of external sensors to generate sensor data;
an onboard computer configured to:
receive the sensor data;
detect other road users including a second vehicle, based on the sensor data;
determine second vehicle data for the second vehicle, including second vehicle speed, second vehicle acceleration, and second vehicle trajectory;
determine a second vehicle predicted path for the second vehicle; and
determine a planned path for the autonomous vehicle; and
a collision probability platform including:
a collision probability determination module configured to:
determine that the second vehicle is within a threshold distance of the autonomous vehicle;
receive the second vehicle data and the second vehicle predicted path from the onboard computer;
identify an imminent risk of the second vehicle colliding with the autonomous vehicle; and
transmit a vehicle honk instruction based on identifying the imminent risk; and
a honk module configured to:
receive the vehicle honk instruction;
emit a vehicle honk in response to the vehicle honk instruction, wherein a volume of the vehicle honk is based on a probability of the imminent risk of the second vehicle colliding with the autonomous vehicle; and
prevent, for a selected period of time after emitting the vehicle honk, emission of another vehicle honk.

2. The autonomous vehicle of claim 1, wherein the collision probability determination module is further configured to identify the imminent risk by determining a time to the second vehicle colliding with the autonomous vehicle and determining that the time is below a selected threshold time.

3. The autonomous vehicle of claim 1, wherein the collision probability determination module is further configured to;
identify the imminent risk by determining a probability of the second vehicle colliding with the autonomous vehicle; and
determine that the probability is above a selected threshold probability.

4. The autonomous vehicle of claim 1, wherein the second vehicle data includes a second vehicle driving direction, and wherein the second vehicle driving direction includes one of driving forward or reversing.

5. The autonomous vehicle of claim 4, wherein the collision probability determination module is further configured to:
determine that the second vehicle is reversing based on the second vehicle data; and
increase a probability of the second vehicle colliding with the autonomous vehicle.

6. The autonomous vehicle of claim 4, wherein the collision probability determination module is further configured to:
determine that the second vehicle is behind the autonomous vehicle; and
identify the imminent risk by determining a probability that the second vehicle will rear-end the autonomous vehicle.

7. The autonomous vehicle of claim 6, wherein the honk module is further configured to emit the vehicle honk from speakers facing outward from a rear of the autonomous vehicle toward the second vehicle.

8. A method for emitting honks to prevent vehicle collisions, comprising:
receiving sensor data from a plurality of vehicle sensors;
detecting other road users including a second vehicle, based on the sensor data;
determining second vehicle data for the second vehicle, including second vehicle speed, second vehicle acceleration, and second vehicle trajectory;
determining a second vehicle predicted path for the second vehicle;
determining a planned path for an autonomous vehicle;
determining that the second vehicle is within a threshold distance of the autonomous vehicle;
identifying an imminent risk of the second vehicle colliding with the autonomous vehicle;
emitting a vehicle honk in response to identifying the imminent risk, wherein a volume of the vehicle honk is based on a probability of the imminent risk of the second vehicle colliding with the autonomous vehicle; and
preventing, for a selected period of time after emitting the vehicle honk, emission of another vehicle honk.

9. The method of claim 8, further comprising identifying the imminent risk by determining a time to the second vehicle colliding with the autonomous vehicle and determining that the time is below a selected threshold time.

10. The method of claim 8, further comprising:
identifying the imminent risk by determining a probability of the second vehicle colliding with the autonomous vehicle; and
determining that the probability is above a selected threshold probability.

11. The method of claim 8, wherein the second vehicle data includes a second vehicle driving direction, and wherein the second vehicle driving direction includes one of driving forward or reversing.

12. The method of claim 11, further comprising:
determining that the second vehicle is reversing based on the second vehicle data; and
increasing a probability of the second vehicle colliding with the autonomous vehicle.

13. The method of claim 11, further comprising:
determining that the second vehicle is behind the autonomous vehicle; and
identifying the imminent risk by determining a probability that the second vehicle will rear-end the autonomous vehicle.

14. The method of claim 13, wherein emitting the vehicle honk includes emitting the vehicle honk from speakers facing outward from a rear of the autonomous vehicle toward the second vehicle.

15. One or more non-transitory computer-readable media storing instructions executable to perform operations, the operations comprising:
receiving sensor data from a plurality of vehicle sensors;
detecting other road users including a second vehicle, based on the sensor data;
determining second vehicle data for the second vehicle, including second vehicle speed, second vehicle acceleration, and second vehicle trajectory;
determining a second vehicle predicted path for the second vehicle;
determining a planned path for an autonomous vehicle;
determining that the second vehicle is within a threshold distance of the autonomous vehicle;
identifying an imminent risk of the second vehicle colliding with the autonomous vehicle;
emitting a vehicle honk in response to identifying the imminent risk, wherein a volume of the vehicle honk is based on a probability of the imminent risk of the second vehicle colliding with the autonomous vehicle; and
preventing, for a selected period of time after emitting the vehicle honk, emission of another vehicle honk.

16. The one or more non-transitory computer-readable media of claim 15, the operations further comprising identifying the imminent risk by determining a time to the second vehicle colliding with the autonomous vehicle and determining that the time is below a selected threshold time.

17. The one or more non-transitory computer-readable media of claim 15, the operations further comprising:
identifying the imminent risk by determining a probability of the second vehicle colliding with the autonomous vehicle; and
determining that the probability is above a selected threshold probability.

18. The one or more non-transitory computer-readable media of claim 15, wherein the second vehicle data includes a second vehicle driving direction, and wherein the second vehicle driving direction includes one of driving forward or reversing.

19. The one or more non-transitory computer-readable media of claim 18, the operations further comprising:
determining that the second vehicle is reversing based on the second vehicle data; and
increasing a probability of the second vehicle colliding with the autonomous vehicle.

20. The one or more non-transitory computer-readable media of claim 18, the operations further comprising:
determining that the second vehicle is behind the autonomous vehicle; and
identifying the imminent risk by determining a probability that the second vehicle will rear-end the autonomous vehicle.

* * * * *